Nov. 14, 1939.　　　　F. H. ROBY　　　　2,179,957
WELDER CONTROL SYSTEM
Filed July 1, 1937　　　4 Sheets-Sheet 1

INVENTOR
Frank H. Roby.
BY Myron J. Seibold
ATTORNEY

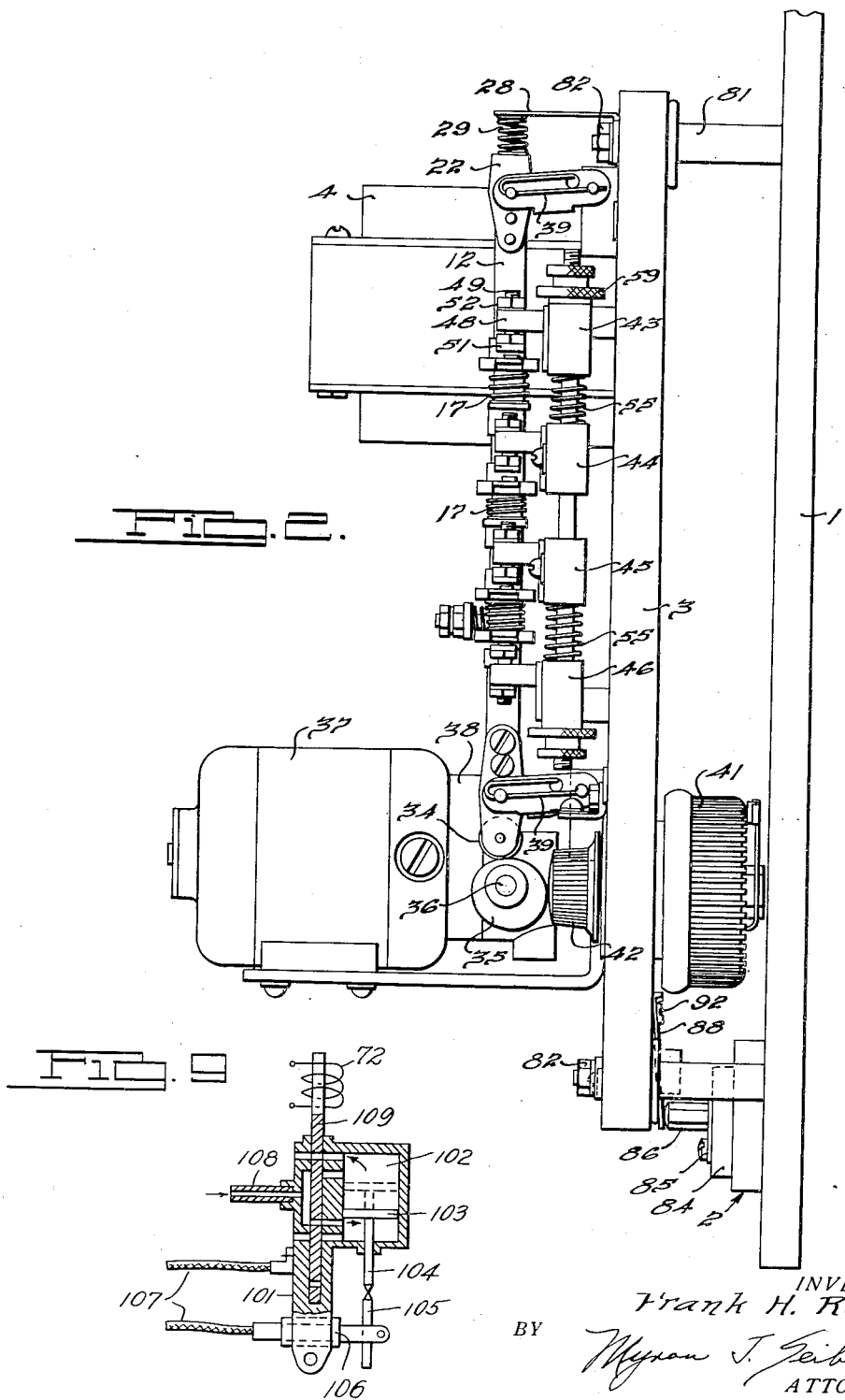

Nov. 14, 1939.　　　　F. H. ROBY　　　　2,179,957
WELDER CONTROL SYSTEM
Filed July 1, 1937　　　4 Sheets-Sheet 3
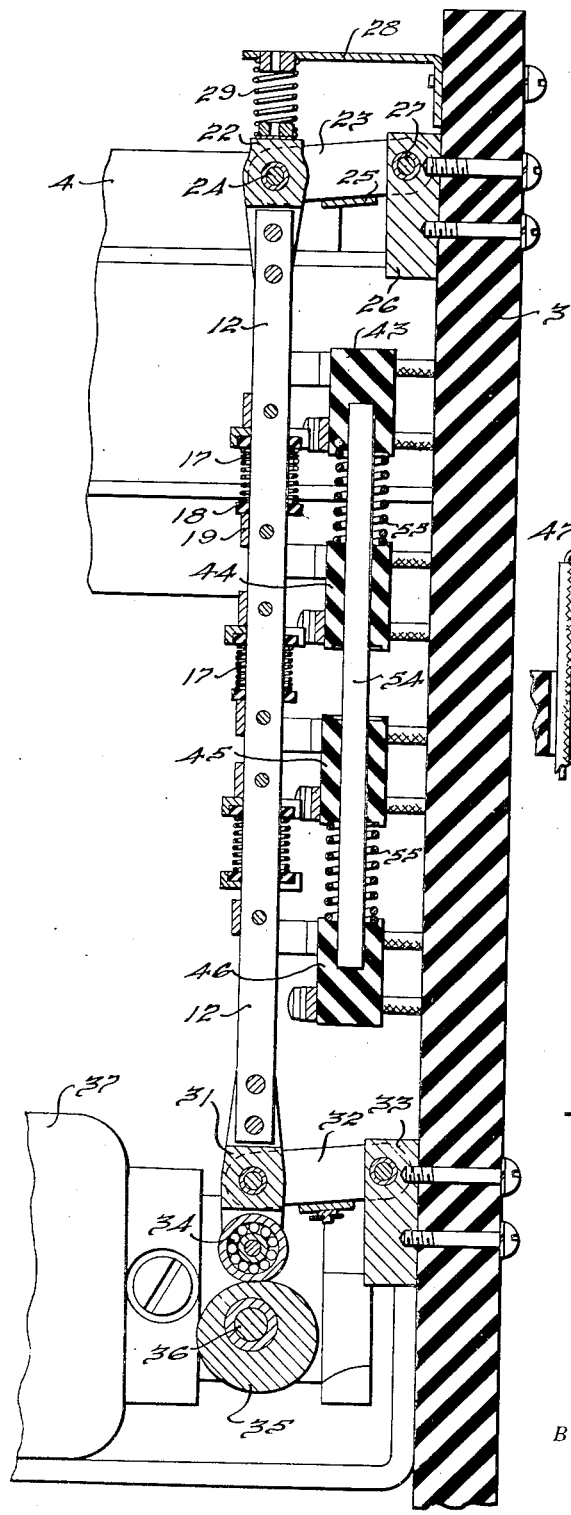
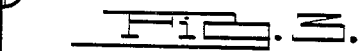
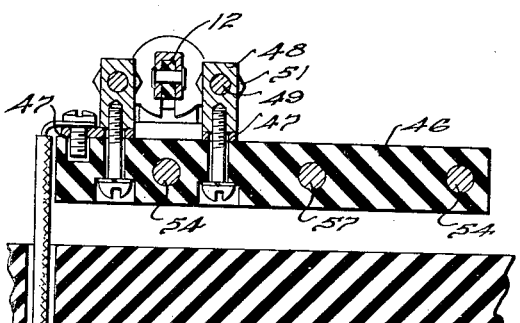
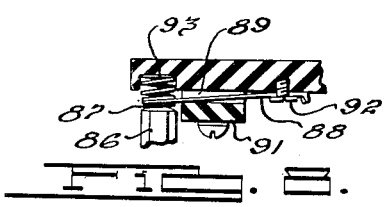
INVENTOR
Frank H. Roby.
BY
ATTORNEY

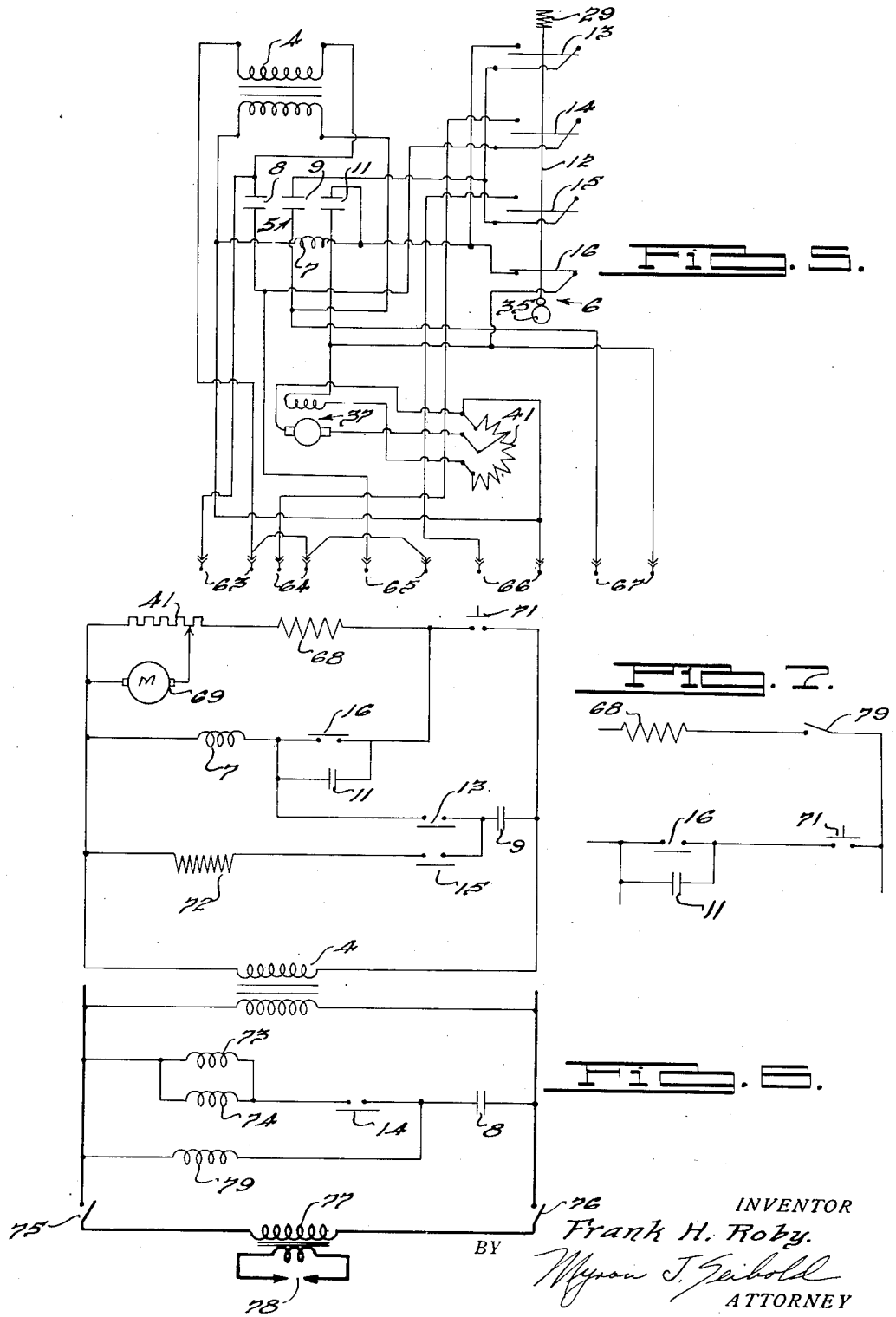

Patented Nov. 14, 1939

2,179,957

UNITED STATES PATENT OFFICE 2,179,957

WELDER CONTROL SYSTEM

Frank H. Roby, Milwaukee, Wis., assignor to Square D Company, Detroit, Mich., a corporation of Michigan Application July 1, 1937, Serial No. 151,358

15 Claims. (Cl. 219—4)

This invention relates to a system of electric welder control and has for its primary object the provision of a motor driven repeat timer for electric welding control and a system employing the same which shall be extremely simple, economical and durable and which shall afford a wide range of welding speeds including very short welding times.

Another object of the present invention is an improved motor driven welder timing device which shall obviate the necessity of a magnetic clutch or other means for picking up the timing contacts.

Another object of the invention is to provide an automatic welder control system utilizing a synchronizing relay which initiates the welding cycle and which can be energized only in a definite position of a timing relay.

Another object of the invention is to provide an automatic welder control system using a motor driven timing relay in which the motor may be either continuously operated or may be energized only with the initiation of the welding cycle without causing an unduly long welding time for the initial welding operation.

Other objects and features of this invention will be readily apparent to those skilled in the art from the following specification and the appended drawings illustrating certain embodiments of the invention in which:

Figure 2 is a side elevational view of the panel shown in Figure 1.

Figure 3 is a vertical sectional view on the line III—III of Figure 1.

Figure 4 is a partial horizontal sectional view on the line IV—IV of Figure 1.

Figure 5 is a schematic wiring diagram for the control panel.

Figure 6 is a simplified wiring diagram of the welder control system showing all its component parts.

Figure 7 is a partial simplified wiring diagram of a modified system.

Figure 8 is a detail section of the panel connection terminals.

Figure 9 is a generally diagrammatic view showing the operating parts of a welding machine to which the control system may be applied.

Figure 1:
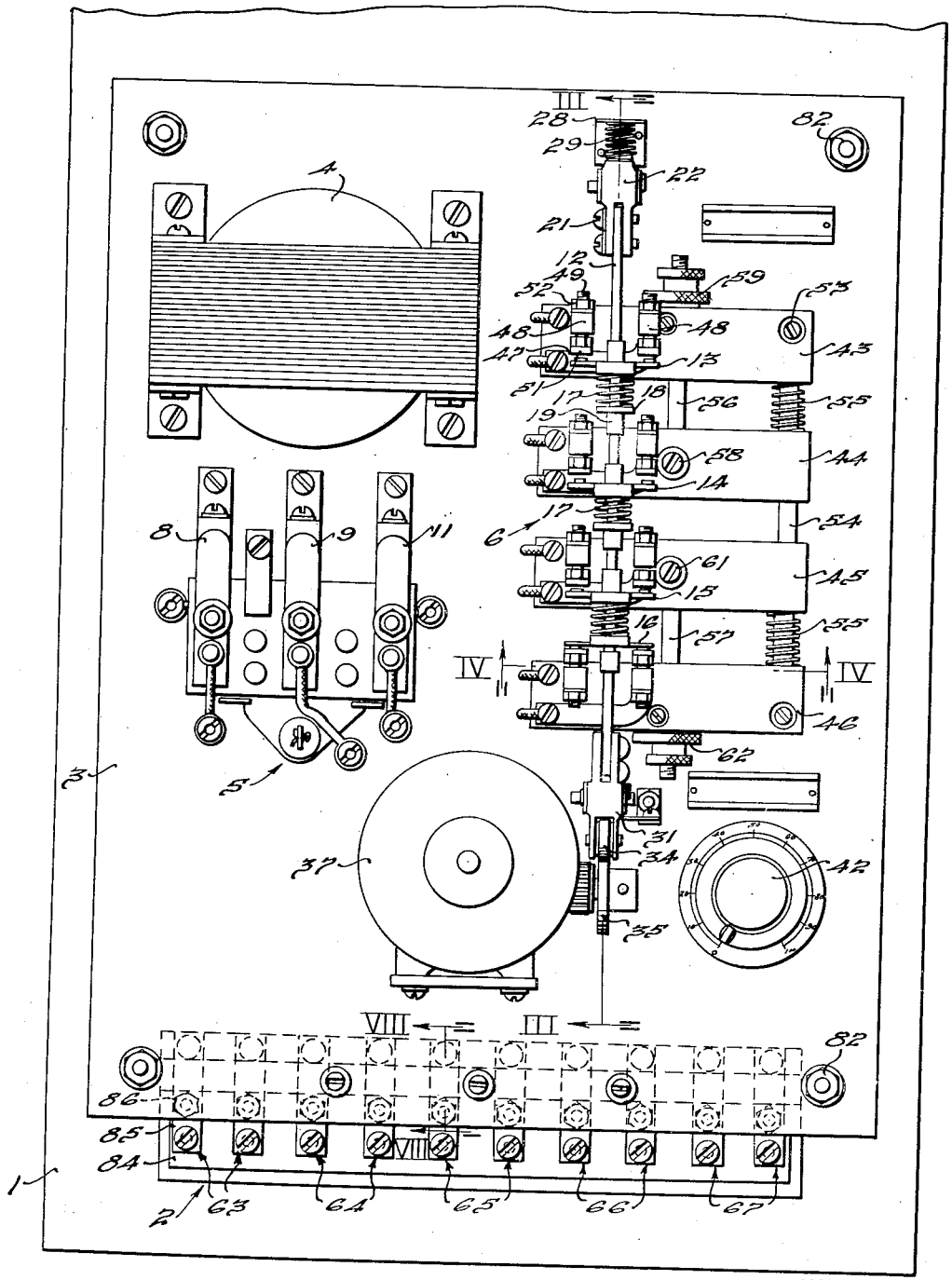
Figure 1 is a front elevational view of a control panel according to the present invention.

The control panel according to the present invention comprises an exterior supporting or mounting plate 1 having mounted thereon a terminal board 2 and a panel 3 supporting the control elements of the system and removably mounted with respect to the mounting plate 1 and the terminal board 2. Upon the panel are mounted a transformer 4, a control relay indicated generally at 5 and a timing relay indicated generally at 6. The control relay 5 may be of conventional form and its details of construction form no part of this invention. It is a magnetically operated relay of the normally open type having an operating coil 7 shown only schematically in Figures 5 and 6 and is provided with three cooperating sets of contacts 8, 9 and 11.

The timing relay 6, as shown in Figures 1 to 4 inclusive, embodies a reciprocable insulating rod 12 having mounted thereon spring biased bridging contact elements 13, 14, 15 and 16. Each of these bridging contacts is biased on the rod by means of a compression spring 17 disposed about the rod and having its end remote from the bridging contact received within a washer 18 pressed against a stop 19 on the rod. This construction is duplicated for each of the bridging contacts with the exception of the lowermost contact 16 which is reversed in direction and is closed at the extreme lower position of the rod 12. The rod 12 at its upper end is attached by means of studs 21 within a slot in a member 22 to which is pivotally connected a pair of arms 23 as by means of a pivot pin 24, the arms 23 being rigidly connected by a cross piece 25 and pivoted at their opposite ends to a base piece 26 as by means of a pin 27. The base piece 26 is rigidly supported on the panel 3. A stop 28 is rigidly secured to the panel 3 and a compression spring 29 disposed between the member 22 and the stop 28 serves to bias the rod 12 in a downward direction. At its bottom end the rod 12 is similarly connected to a member 31 pivotally mounted on arms 32 which are, in turn, pivotally connected to a base piece 33 rigid with the panel. The bottom end of the member 31 is provided with a ball bearing roller 34 which bears against the operating surface of a cam 35 which is rigidly mounted on a shaft 36 and by its rotation serves to effect reciprocation of the rod 12. The shaft 36 is driven by an electric motor 37 through a set of reduction gears within the casing 38 which may be of conventional form. The spring elements 39 (Figure 2) pass through the pivot pins for the arms 23 and 32 and serve to insure the proper rotation of the pins within the bearings provided within the members 22 and 31.

The operating motor 37 is herein illustrated as a series wound motor provided with a potentiometer circuit to give variable speed operation. This system of control not only provides for variation in speed over a relatively wide range but also gives very favorable accelerating characteristics when the motor is started only with the initiation of the welding cycle. This potentiometer arrangement includes the rheostat by-passing and in series with the motor armature, as more clearly illustrated in the simplified schematic wiring diagram of Figure 6 which shows the resistance in series with the series wound motor field and with a variable portion of this resistance by-passed by the motor armature. This arrangement, in addition to the above stated advantages, also results in a reduction in the percentage of speed change due to fluctuations in line voltage and gives to the series motor operating characteristics more nearly approaching those of a variable speed, direct current motor of the shunt or compound type.

The timing relay includes a distinct arrangement for varying the positions of certain of the stationary contacts. Each set of stationary contacts is mounted upon an insulating block and these are here represented in order from the top to the bottom by the numerals 43, 44, 45 and 46. Each of the stationary contacts includes a terminal connector 47 extending to the left hand side of the blocks 43 to 46 and having mounted thereagainst posts 48 extending forwardly of the back insulating blocks. Within the posts 48 are threaded studs 49 bearing contact surfaces 51 at their lower ends in the case of the upper three sets of contacts and at the upper ends in the case of the lowest sets. Nuts 52 may be provided for preventing undesired adjustment or movement of the stationary contacts. This arrangement is shown in Figures 1 and 2 and in enlarged form in Figure 4 and provides means not only for mounting the stationary contacts but for providing adjustment for each stationary contact individually. The end blocks 43 and 44 supporting the sets of stationary contacts are rigidly secured to the panel 3 by means of studs 53 and located in these extreme blocks and extending therebetween are guide rods 54 upon which are slidably mounted the intermediate contact supporting insulating blocks 44 and 45. Compression springs 55 are provided between the end and intermediate blocks and serve to bias the blocks 44 and 45 to intermediate positions remote from the blocks 43 and 46. Adjustment rods 56 and 57 are provided, the rod 56 being secured to the block 44 by stud 58 and extending slidably through the block 43 and provided at its upper end with an adjusting nut 59. The rod 57 is tied to the block 45 by means of a stud 61 and extends slidably through the block 46 and is provided at its lower end with an adjusting nut 62. With this arrangement it is seen that while the stationary contacts cooperating with plates 13 and 15 can only be adjusted by means of their individual mountings on the blocks 48, means is provided for quick and easy adjustment of the positions of the stationary contacts cooperating with the bridging contacts 14 and 15 by tightening or loosening the studs 59 and 62 to shorten or extend the rods 56 and 57 and to effect movement bodily of the contact supporting blocks 44 and 45 and hence provide for quick and easy individual and separate adjustment of the contacts cooperating with the bridging contacts plates 14 and 15.

The panel 3 is supported on the back plate 1 in spaced relation by means of spacer bolts 81 at the corner of the panels over which the panel 3 is mounted and maintained in rigid supporting relation by the nuts 82 at the front. The terminal board 2 is comprised of a pair of insulating blocks 83 and 84 rigidly secured to the front face of the back plate 1 and having mounted thereon a plurality of terminal connectors 85 having connected thereto rigid contact elements 86. Cooperating with the contact elements 86 are contact surfaces 87 mounted on connectors 88 on the back face of the panel 3. The connectors 88 are loosely received in recesses 89 in an insulating block 91 which is rigidly secured to the back face of the panel 3. The connectors 88 are maintained in place by the engagement of their terminal screws 92 in recesses in the back face of the panel. Compression springs 93 are provided biasing the contact surfaces 87 away from the panel 3 and providing contact pressure between the contact elements 86 and the contact surfaces 87 when the panel 3 is in supported relation with the back plate 1. The internal wiring of the control elements mounted on the panel is connected terminally to the terminal screws 92 on the connectors 88 and the exterior control wires leading to the various operating and operated elements exterior to the panel are connected to the terminal connectors 84. By this means it is seen that upon removal of the nuts 82 the panel 3 and the control elements supported thereon may be directly removed from the back plate for the replacement of an entire panel and for repair without disturbing the exterior connections.

The welding control system herein illustrated is intended for operation with a pneumatically operated welding tool having an operating valve in the handle and a check valve in the airline leading to the handle to prevent leakage of air through the operating valve in the welding tool or the packing gland in the head of that tool. Two single pole welder contactors, each having a separate operating coil and connected one in each side of the welding transformer primary are used, although it is obvious that a double pole contactor having a single operating coil may be used with equal facility without changing the wiring connections as the operating coils of the single pole contacts are connected in parallel. The welding cycle is divided into four periods corresponding to a "delay" period to permit the pressure to be built up within the welding tool upon the welding electrodes, a "weld" period during which current is passed through the work between the electrodes, a "hold" period in which the current is turned off but the pressure maintained upon the electrodes and an "off" period in which the pressure on the electrodes is released. It is, of course, to be understood that while the system has been shown in its most detailed form for the pneumatically operated welder, it can obviously be applied with simplifications to mechanical and hand operated electric welding machines with the same welding cycle or a simplified cycle omitting either or both of the "hold" and "delay" periods, depending upon the particular type of machine used and the requirements of the welding.

The internal wiring diagram of the panel is shown in Figure 5 but will be explained hereinafter with reference to the schematic simplified control diagram of Figure 6. The panel wiring of Figure 5 terminates in 10 terminals designated as pairs of terminals 63, 64, 65, 66 and 67. The terminals 63 are line terminals to which the power line is connected. The terminals 64 are connected to the welding contactor operating coils. The terminals 65 are connected to the check valve operating coil. The terminals 66 are connected to the operating coil for the operating valve of the pneumatically operating welding tool. The terminals 67 are connected to an operating push button. In the simplified diagram of Figure 6 the motor 37 is split up to include the series wound field 68 connected in series with the rheostat 41 and an armature 69 adjustably connected across the register 41. 71 designates the operating push button. 7 designates the operating coil of the control relay 5. 72 designates the operating coil for the valve in the pneumatically operated welding tool which supplies pressure to the welding electrodes. 73 and 74 represent the operating coils of contactors 75 and 76 in each side of the welding transformer primary. The welding transformer is designated at 77 and the welding electrodes are schematically shown at 78. The operating coil for the airline check valve is shown at 79.

The operation of the welder control system will now be described. The rheostat 41 is adjusted to give the desired speed of operation and the contact blocks 44 and 45 are adjusted in position to give the desired "weld" and "off" periods respectively. By adjusting the contact supporting block 44 upwardly a shorter "weld" time is obtained and by adjusting the contact supporting block 45 downwardly a shorter "off" period is obtained. The differential or spacing difference between the blocks 44 and 45 will determine the "delay" and "hold" periods which will, of course, be uniform if a uniform cam is used. For differential in these two periods variable shaped cams may be used to secure a predominance of "delay" time or a predominance of "hold" time as desired, these cams being substituted for the cam 35. To initiate a series of welds the push button 71 is closed, thus placing the motor 37 across the line and initiating its operation. The rod 12 will then begin to move as the motor accelerates its speed. As long as the bridging contact 16 remains open the welding cycle is not initiated but when the contact 16 bridges its corresponding stationary contacts upon the extreme lower movement of the rod 12, energization of the control relay operating coil 7 is momentarily effected and the control relay 5 closes, maintaining itself through bridging contact 13 and the control relay contacts 9. The bridging contact 16 is so regulated with relation to its cooperating stationary contacts as to be closed only during the extreme lower movement of the rod 12 and the bridging contact 13 is regulated with respect to its cooperating stationary contacts as to be open only during the extreme lower movement of the contact bar 12. The duration of the opening of contact 13 is desired to be coincident with or not appreciably greater than the closing of bridging contact 16 so that once the control relay 6 has been operated the bridging contact 13 will be closed so as to have the maintaining circuit regardless of opening of the push button 71. The bridging contact 16 is by-passed by control relay contact 11 but the circuit for the operating coil 7 of the control relay 5 will not be maintained if the push button 71 is open unless bridging contact 13 is closed. Assuming now that contact 16 is closed, energizing the cooperating coil 7, the control relay 51 closes its contacts 8, 9 and 11. Bridging contact 13 is also closed at this time so even if push button 71 is let up one complete welding cycle will be performed. Closing of the control relay contact 8 energizes the operating coil 79 for the check valve and opens airline pressure to the welding tool operating valve. As the rod 12 moves upwardly the bridging contact 15 engages its cooperating stationary contacts and energizes the welding tool check valve operating coil 72 through the control relay contact 9. As the rod 12 continues to move upwardly bridging contact 14 closes its cooperating stationary contacts and energizes the operating coils 73 and 74 for the welding contactors 75 and 76 which close passing current through the work between the welding electrodes 78. The rod 12 continues to move upwardly until it passes the highest point on the cam 35 and then in its downward direction first separates the contact 14 which deenergizes the welder contact operating coils and interrupts the current through the work and in its continued downward movement separates the bridging contact 15 which deenergizes the check valve on the welding tool and relieves the pressure on the welding electrodes. If the push button 71 has not been held down the rod moves downwardly until bridging contact 13 is open which opens the holding circuit through the operating coil 7 of the control relay 5 and drops out the control relay, thus deenergizing the entire system. It is to be noted that when push button 71 is released immediately after closing of the control relay, the control relay is maintained through its contact 9 and bridging contact 13 and that the motor circuit is completed through control relay contacts 9 and 11 and bridging contact 13. If the control push button 71 is maintained in depressed position the system will continue to make successive welds in the manner described until the push button is released and bridging contact 13 opened.

It is to be particularly noted in the welder control system disclosed that energization of the system to initiate a welding cycle is determined by closing of the control relay 5 and this can be effected only when the bridging contact 16 is closed, which occurs only in the "off" period of the cycle and which is preferably of a relatively short period in the extreme lower position of the operating rod 12. With this system it is impossible to energize the welding cycle at any point except in the "off" period which is a necessary feature of operation as it would obviously be undesirable to energize the system, for instance, when the welder contactor control contact 14 were closed without allowing for a "delay" period to effect building up of pressure on the welding electrodes. If the push button 71 should be closed while the operating rod is in a position where bridging contact 16 is open either in the upward or downward direction, the rod 12 will continue in its motion without energizing the system until the bridging contact 16 is closed, whereupon the control relay is energized and the welding cycle initiated. Using an operating motor for the timer having high acceleration, it is possible that even in the worst possible case where the rod 12 is in a position where the bridging contact 16 is closed with the motor stopped so that the control relay is immediately energized, it has been found that the motor builds up in speed fairly well during the "delay" period so that the "weld" period is not undesirably long for most classes of operation, even in the first weld.

Where extreme accuracy in the first weld is desired the motor 37 may be connected to the line and brought up the speed before the push button is operated to initiate the weld. This would necessitate simply placing the push button 71, in Figure 6, in the circuit leading from the right hand side of the transformer 4 to the contact set including bridging contact 16 rather than in the circuit including the motor, which arrangement has been shown in the partial diagram of Figure 7, where an additional switch 79 is provided for connecting and disconnecting the motor as desired. With this operating arrangement the switch 79 is closed to initiate motor operation and thereafter closing of the push button 71 will effect initiation of the welding cycle without the necessity of bringing the motor up to speed. Again, however, regardless of the position of the rod 12 when push button 71 is depressed, the control relay will not be energized to energize the welding control system until the rod 12 has reached a position at which bridging contact 16 is closed so that, in each case, the control system is energized at the "off" period of the cycle.

The arrangement shown partially in Figure 7 is adapted for use not only with the type of motor particularly described but also with a synchronous motor utilizing any conventional type of variable speed transmission to secure variations in the operating speed of the welding tool. This arrangement secures not only extremely accurate timing but also permits the expansion of the system to include the synchronization of the operation of the welding contactors to the preferred point on the voltage wave of the supply source.

Figure 9 illustrates a conventional type of welding machine in diagrammatic form to which the control system of the present invention may be applied. This includes a frame 101 which supports a cylinder 102 in which is disposed a piston 103 connected to a movable electrode 104. A cooperating electrode 105 is mounted on the lower part of the frame and insulated therefrom by an insulating sleeve 106. Leads 107 are connected to the secondary of the welding transformer to energize the electrodes 104 and 105. A fluid pressure inlet 108 is indicated for connection to any suitable source of fluid pressure, preferably compressed air, which is used to actuate the piston 103 within the cylinder 102. The valve is shown in the frame 101 and includes a movable valve portion 109 adapted to be moved by the solenoid coil 72. The position of the parts illustrated in Figure 9 is at the conclusion of a hold time in which the coil 72 has just been deenergized to move the valve portion 109 downwardly and connect the inlet port on the under side of the piston 103 with the source of fluid pressure. The force is now exerted tending to move the upper electrode to separated position into the dotted line position of the piston as shown. To move the electrode to apply pressure to the work the coil 72 is energized moving the valve portion 109 upwardly and connecting the port on the upward side of the piston with the source of fluid pressure, thus moving the electrode downwardly into engagement with the work. The structure illustrated in Figure 9 is entirely conventional and is shown herein simply to illustrate one type of welding machine to which the method and control system of applicant's invention is applicable.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What is claimed is:

1. In a welder control system for electrically welding work by passing current therethrough between electrodes pressed against the work, a motor driven contact making and breaking member, an electromagnetic contactor for controlling the passage of current through the work, an energizing circuit for said contactor including said motor driven contacts, means for initiating a welding cycle, and means for preventing energization of said contactor by said motor driven contacts until after the motor driven member has passed through a position corresponding to the "off" period in the welding cycle after actuation of said initiating means.

2. In a welder control system for electrically welding work by passing current therethrough between electrodes pressed against the work, a plurality of sets of contacts, motor driven means for operating said contacts, an electromagnetic contactor controlling the passage of current through the work, an energizing circuit for said contactor including therein one set of said cooperating contacts and the contacts of an auxiliary relay, means for initiating a welding cycle, another set of said cooperating contacts controlling the energization of said auxiliary relay when said initiating means is actuated to effect closing of the relay contacts to place the energizing circuit of the contactor under the control of the first mentioned set of cooperating contacts, said another set of contacts functioning to energize said relay only in a predetermined period in the welding cycle.

3. In a welder control system for electrically welding work by passing current therethrough between electrodes pressed against the work, a plurality of sets of cooperating contacts, motor driven means for operating said contacts, an electromagnetic contactor for controlling the passage of current through the work, an energizing circuit for said contactor including one set of said cooperating contacts and the contacts of an auxiliary relay, means for initiating a welding cycle, another set of said cooperating contacts controlling the energization of said auxiliary relay when the initiating means is actuated and limiting energization thereof to a period wherein the first mentioned set of contacts is open.

4. In a welder control system for electrically welding work by passing current therethrough between electrodes pressed against the work by fluid pressure, a plurality of sets of cooperating contacts, a motor driven member for operating said contacts in cyclic arrangement, electromagnetically operated valve means controlling the application of fluid pressure to said electrodes, an electromagnetic contactor controlling the passage of current through the work, an auxiliary relay, an energizing circuit for said valve means including one set of said cooperating contacts and contacts of said relay, an energizing circuit for said contactor including another set of said cooperating contacts and contacts of said relay, means for initiating a welding cycle, and a third set of said cooperating contacts controlling the energization of said relay.

5. In a welder control system for electrically welding work by passing current therethrough between electrodes pressed against the work by fluid pressure, a plurality of sets of cooperating contacts, a motor driven member for operating said contacts in cyclic arrangement, electromagnetically operated valve means controlling the application of fluid pressure to said electrodes, an electromagnetic contactor controlling the passage of current through the work, an auxiliary relay, an energizing circuit for said valve means including one set of said cooperating contacts and contacts of said relay, an energizing circuit for said contactor including another set of said cooperating contacts and contacts of said relay, means for initiating a welding cycle, and a third set of said cooperating contacts controlling the energization of said relay and limiting energization thereof to the "off" period in the welding cycle, a fourth set of said cooperating contacts forming a maintaining circuit for said auxiliary relay to insure performance of a full welding cycle independent of the initiating means and the third set of cooperating contacts.

6. In a welder control system for electrically welding work by passing current therethrough between electrodes pressed against the work by fluid pressure, a plurality of sets of cooperating contacts, motor driven means for effecting operation of said contacts, electromagnetically operated valve means controlling the application of fluid pressure to said electrodes, an electromagnetic contactor for controlling passage of current through the work, an auxiliary relay, an energizing circuit of said valve means including one set of cooperating contacts and contacts of said relay, an energizing circuit for said contactor including a second set of cooperating contacts and contacts of said relay, means for initiating the welding cycle including means for connecting said motor to the line and for effecting energization of said auxiliary relay, and a third set of said cooperating contacts in the energizing circuit of said relay whereby complete closing of the energizing circuit of the relay can be effective only in the "off" period in the welding cycle.

7. In a welder control system for electrically welding work by passing current therethrough between electrodes pressed against the work by fluid pressure, a plurality of sets of cooperating contacts, motor driven means for effecting operation of said contacts, electromagnetically operated valve means controlling the application of fluid pressure to said electrodes, an electromagnetic contactor for controlling passage of current through the work, an auxiliary relay, an energizing circuit for said valve means including one set of cooperating contacts and contacts of said relay, an energizing circuit for said contactor including a second set of cooperating contacts and contacts of said relay, means for initiating the welding cycle including means for immediately connecting the motor to the line to initiate driving movement thereof regardless of the cyclic position of the sets of cooperating contacts, said initiating means also closing at one point the energizing circuit of said relay, and a third set of said cooperating contacts located in said energizing circuit and adapted to be closed only in the "off" period of the welding cycle, whereby, regardless of the cyclic position of the contacts when the initiating means is operated, the system will not become energized to effect control of the valve means and contactor by the motor driven sets of contacts until the "off" period in the welding cycle is reached.

8. In a welder control system for electrically welding work by passing current therethrough between electrodes pressed against the work by fluid pressure, a plurality of sets of cooperating contacts, motor driven means for operating said contacts in a predetermined cycle, means for effecting relatively continuous operation of said motor independently of the welding operation, electromagnetically operated valve means controlling the application of fluid pressure of said electrodes, an electromagnetic contactor for controlling passage of current through the work, an auxiliary relay, an energizing circuit for said valve means including one set of cooperating contacts and contacts of said relay, an energizing circuit for said contactor including another set of said cooperating contacts and contacts of said relay, and an energizing circuit for said auxiliary relay including a third set of said cooperating contacts and means for initiating a welding operation, whereby upon actuation of said initiating means the control system is not energized until said last mentioned set of cooperating contacts is closed, whereupon the auxiliary relay is energized and energization of the valve means and contactor placed under the control of said two first mentioned sets of cooperating contacts.

9. In a welder control system for electrically welding work by passing current therethrough between electrodes pressed against the work by fluid pressure, a plurality of sets of cooperating contacts, motor driven means for operating said contacts in a predetermined cycle, means for effecting relatively continuous operation of said motor independently of the welding operation, electromagnetically operated valve means controlling the application of fluid pressure to said electrodes, an electromagnetic contactor for controlling passage of current through the work, an auxiliary relay, an energizing circuit for said valve means including one set of cooperating contacts and contacts of said relay, an energizing circuit for said contactor including another set of said cooperating contacts and contacts of said relay, an energizing circuit for said auxiliary relay including a third set of cooperating contacts and means for initiating a welding operation, a fourth set of cooperating contacts forming a holding circuit for said auxiliary relay and permitting deenergization thereof only at the "off" period in the welding cycle, whereby, regardless of where the initiating means is opened, the system will not be deenergized until the complete cycle is performed.

10. In a welder control system for electrically welding work by passing current therethrough between electrodes pressed against the work by fluid pressure, motor driven control means for effecting the operations in the welding cycle in predetermined relation, means for controlling the application of fluid pressure to said electrodes, an electric contactor controlling the passage of current through the work, said motor driven means being normally inoperative to effect operation of the last two mentioned means, and auxiliary means under the control of said motor driven means and actuable only in the "off" period of the welding cycle for placing the control of said fluid pressure controlling means and current controlling means under the motor driven means to perform the welding operation.

11. In a welder control system for electrically welding work by passing current therethrough between electrodes pressed against the work by fluid pressure, a plurality of sets of cooperating contacts, reciprocable means for effecting cyclic operation of said contacts, motor driven cam means for effecting reciprocation of said reciprocable means, electromagnetically operated valve means controlling the application of fluid pressure to said electrodes, an electromagnetic contactor controlling the passage of current through the work, sequentially operated sets of said contacts controlling respectively the energization of said valve means and of said electromagnetic contactor, the differential between the periods of operation of said sets determining the delay time in the welding cycle for building up fluid pressure and the hold time for maintaining fluid pressure after the welding current is interrupted, and means for regulating the speed of movement of said reciprocable means in its opposite directions to effect a predominance of hold or delay times in the welding cycle as desired.

12. In a welder control system for electrically welding work by passing current therethrough between electrodes pressed against the work by fluid pressure, a plurality of sets of cooperating contacts, a motor driven member for operating said contacts, electromagnetically operated valve means controlling the application of fluid pressure to said electrodes, an electromagnetic contactor controlling the passage of current through the work, certain of said sets of contacts controlling the energization of said valve means and of said contactor, normally open contacts in the energizing circuits between said certain sets of contacts, valve means and contactor, one set of said first mentioned contacts effecting closure of said normally open contacts to energize the system, said last mentioned set being timed for operation only in a predetermined part of the welding cycle.

13. In a welder control system for electrically welding work by passing current therethrough between electrodes pressed against the work by fluid pressure, a plurality of sets of cooperating contacts, a motor driven member for operating said contacts, electromagnetically operated valve means controlling the application of fluid pressure to said electrodes, an electromagnetic contactor controlling the passage of current through the work, certain of said sets of contacts controlling the energization of said valve means and of said contactor, normally open contacts in the energizing circuits between said certain sets of contacts, valve means and contactor, one set of said first mentioned contacts effecting closure of said normally open contacts to energize the system, said last mentioned set being timed for operation only in a predetermined part of the welding cycle, another set of said first mentioned contacts effecting opening of said normally open contacts at the completion of the welding operation to deenergize the system.

14. In a welder control system for electrically welding work by passing current therethrough between electrodes pressed against the work, motor driven contact making and breaking means for controlling the passage of current through the work, means for initiating a welding cycle, and means for preventing the passage of current through the work until after the motor driven means has been in a position corresponding to the "off" period in the welding cycle after actuation of said initiating means.

15. In a welder control system for electrically welding work by passing current therethrough between electrodes pressed against the work, motor driven contact making and breaking means for controlling the passage of current through the work, auxiliary contacts in series with said motor driven contact making and breaking means, means for initiating a welding cycle, and means effecting closing of said auxiliary contacts and operable only in the "off" period of the welding cycle after actuating said initiating means to place the control of the welding current in said motor driven contact making and breaking means.

FRANK H. ROBY.